(12) United States Patent
Chen

(10) Patent No.: US 12,720,488 B2
(45) Date of Patent: Aug. 25, 2026

(54) PAGING MESSAGE MONITORING METHOD AND APPARATUS, TERMINAL, AND READABLE STORAGE MEDIUM

(71) Applicant: VIVO MOBILE COMMUNICATION CO., LTD., Chang'an Dongguan (CN)

(72) Inventor: Li Chen, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 461 days.

(21) Appl. No.: 18/156,612

(22) Filed: Jan. 19, 2023

(65) Prior Publication Data

US 2023/0156661 A1 May 18, 2023

Related U.S. Application Data

(63) Continuation of application No. PCT/CN2021/109233, filed on Jul. 29, 2021.

(30) Foreign Application Priority Data

Jul. 31, 2020 (CN) ........................ 202010763586.2

(51) Int. Cl.
*H04W 68/02* (2009.01)

(52) U.S. Cl.
CPC .................................. *H04W 68/02* (2013.01)

(58) Field of Classification Search
CPC .................................................... H04W 68/02
USPC ......................................................... 455/458
See application file for complete search history.

(56) References Cited

U.S. PATENT DOCUMENTS

2018/0027522 A1* 1/2018 Lee ....................... H04W 72/21 370/336
2019/0313461 A1* 10/2019 Jung .................. H04W 72/542
2021/0306953 A1 9/2021 Hwang et al.

FOREIGN PATENT DOCUMENTS

CN 106961729 A 7/2017
CN 109076495 A 12/2018
CN 109600831 A 4/2019
CN 111328461 A 6/2020
CN 112770375 A 5/2021
JP 2019533357 A 11/2019

(Continued)

OTHER PUBLICATIONS

Ericsson "Correction to Paging Window Calculation" 3GPP TSG-RAN WG2 #93bis, Apr. 11-15, 2016, pp. 3.

(Continued)

*Primary Examiner* — Joel Ajayi

(57) ABSTRACT

This application discloses a paging message monitoring method and apparatus. The method includes: determining a monitoring range; and performing, according to a paging frame PF and a paging occasion PO, paging message monitoring in the monitoring range until the monitoring range ends or a paging message has been detected; where the monitoring range includes at least one of the following: a first monitoring sub-range or a second monitoring sub-range, where the first monitoring sub-range starts at the 1st radio frame of a paging hyperframe in a first paging time window PTW, and the first PTW ends at the end of the last PF of the first PTW, or the end of the last PO or the end of an MO of the last PO of the first PTW; and the second monitoring sub-range is one or more discontinuous reception DRX cycles in a second PTW.

18 Claims, 3 Drawing Sheets

Determine a monitoring range — S202

Perform, according to a paging frame and a paging occasion, paging message monitoring in the monitoring range until the monitoring range ends or a paging message has been detected — S204

(56) References Cited

FOREIGN PATENT DOCUMENTS

| | | | |
|---|---|---|---|
| WO | 20170135871 | A1 | 8/2017 |
| WO | 2019199391 | A1 | 10/2019 |
| WO | 2019219367 | A1 | 11/2019 |
| WO | 2020032751 | A1 | 2/2020 |

OTHER PUBLICATIONS

Intel "Remaining Issues in eDRX" 3GPP TSG RAN WG2 Meeting #94, May 23, 2016, pp. 6.
Intel Corporation: "Configurations of wake-up signal for feNB-IoT", 3GPP TSG RAN WG1 Meeting #90bis, Oct. 9, 2017, pp. 4.
LTE "Evolved Universal Terrestrial Radio Access (E-UTRA); User Equipment (UE) procedures in idle mode 3GPP TS 36.304 version 15.6.0 Release 15" , ETSI TS 136 304 V15.6.0, dated Jul. 2020, pp. 57.
European Patent Office "Extended European Search Report" From Application No. 21849537.2, Dated Dec. 7, 2023, pp. 16.
Vivo. "Remaining Issues of NR-U Paging" , 3GPP TSG-RAN WG2 Meeting #106, R2-1905627, May 3, 2019 (May 3, 2019), 3 pgs.
Qualcomm Inc. "Page Monitoring in RRC_Inactive State with Short eDRX" 3GPP TSG-RAN WG2 Meeting #109e e-meeting, R2-2000538, Feb. 13, 2020 (Feb. 13, 2020), 7 pgs.
International Patent Application No. PCT/CN2021/109233, International Search Report and Written Opinion with Partial English Machine Translation mailed Sep. 28, 2021, 12 pages.
China Patent Office, "Supplementary Search Report", From Application No. 2020107635862, Dated Mar. 6, 2025, pp. 2.
Nokia, Corrections to Rel-16 NB-IoT enhancements, 3GPP TSG RAN-WG2 #110-e, R2-2005950, Internet<URL: https://www.3gpp.org/ftp/tsg ran/wG2 RL2/TSGR2 110-e/Docs/R2-2005950.zip>, Jun. 12, 2020.
Catt, Paging Mechanism for UE in Idle State, 3GPP TSG-RAN WG2 NR Ad Hoc, R2-1700217, Internet<URL:http://www.3gpp.org/ftp/tsg ran/WG2 RL2/TSGR2 AHS/2017 01 NR/DocS/R2-1700217.zip>, Jan. 7, 2017.
First Office Action dated Jun. 28, 2024 received in corresponding patent family application No. CN202010763586.2. English translation attached.
Grant Notice dated May 20, 2025 received in corresponding patent family application No. CN202010763586.2. English translation attached.
Second Office Action dated Mar. 7, 2025 received in corresponding patent family application No. CN202010763586.2. English translation attached.
First Office Action dated Oct. 31, 2025 received in corresponding patent family application No. EP21849537.2.
Decision to Grant dated Jun. 11, 2024 received in corresponding patent family application No. JP2023500047. English translation attached.
Notice of Reasons for Refusal dated Dec. 5, 2023 received in corresponding patent family application No. JP2023500047. English translation attached.
Written Opinion of the International Search Authority dated Sep. 28, 2021 in International Application No. PCTCN2021109233. English translation attached.
First Office Action dated Dec. 2, 2025 received in corresponding patent family application No. PI2022007417.

* cited by examiner

PAGING MESSAGE MONITORING METHOD AND APPARATUS, TERMINAL, AND READABLE STORAGE MEDIUM

CROSS-REFERENCE TO RELATED APPLICATIONS

This application is a continuation of International Application No. PCT/CN2021/109233, filed on Jul. 29, 2021, which claims priority to Chinese Patent Application No. 202010763586.2, filed in China on Jul. 31, 2020, which are incorporated herein by reference in their entireties.

TECHNICAL FIELD

This application pertains to the field of communication technologies, and specifically relates to a paging message monitoring method and apparatus, a terminal, and a readable storage medium.

BACKGROUND

After introduction of multi-beam and early indication signal into the new radio (NR) system, because length of a paging time window (PTW) is configured currently according to a network without considering that one paging occasion (PO) may include in a multi-beam scenario multiple monitor occasions (MO), in a case that a terminal misses one early indication signal, the terminal may miss some MOs if continuing to use the current mechanism, and consequently the terminal may miss a paging message.

SUMMARY

According to a first aspect of the present disclosure, a paging message monitoring method is provided, applied to a terminal and including: determining a monitoring range; and performing, according to a paging frame PF and a paging occasion PO, paging message monitoring in the monitoring range until the monitoring range ends or a paging message has been detected; where the monitoring range includes at least one of the following: a first monitoring sub-range or a second monitoring sub-range, where the first monitoring sub-range starts at the 1st radio frame of a paging hyperframe in a first paging time window PTW, and the first PTW ends at the end of the last PF of the first PTW, or the end of the last PO or the end of a monitor occasion MO of the last PO of the first PTW; and the second monitoring sub-range is one or more discontinuous reception DRX cycles in a second PTW.

According to a second aspect of the present disclosure, a paging message monitoring apparatus is provided, including: a determining module, configured to determine a monitoring range; and a first monitoring module, configured to perform, according to a PF and a PO, paging message monitoring in the monitoring range until the monitoring range ends or a paging message has been detected; where the monitoring range includes at least one of the following: a first monitoring sub-range or a second monitoring sub-range, where the first monitoring sub-range starts at the 1st radio frame of a paging hyperframe in a first paging time window PTW, and the first PTW ends at the end of the last PF of the first PTW, or the end of the last PO or the end of a monitor occasion MO of the last PO of the first PTW; and the second monitoring sub-range is one or more discontinuous reception DRX cycles in a second PTW.

According to a third aspect of the present disclosure, a terminal is provided. The terminal includes a processor, a memory, and a program or instructions stored on the memory and capable of running on the processor, and when the program or instructions are executed by the processor, the steps of the method according to the first aspect are implemented.

According to a fourth aspect of the present disclosure, a readable storage medium is provided. The readable storage medium stores a program or instructions, and when the program or instructions are executed by a processor, the steps of the method according to the first aspect are implemented.

According to a fifth aspect of the present disclosure, a chip is provided. The chip includes a processor and a communication interface, where the communication interface is coupled to the processor, and the processor is configured to run a program or instructions of a network-side device to implement the method according to the first aspect.

DESCRIPTION OF EMBODIMENTS

Figure 1:
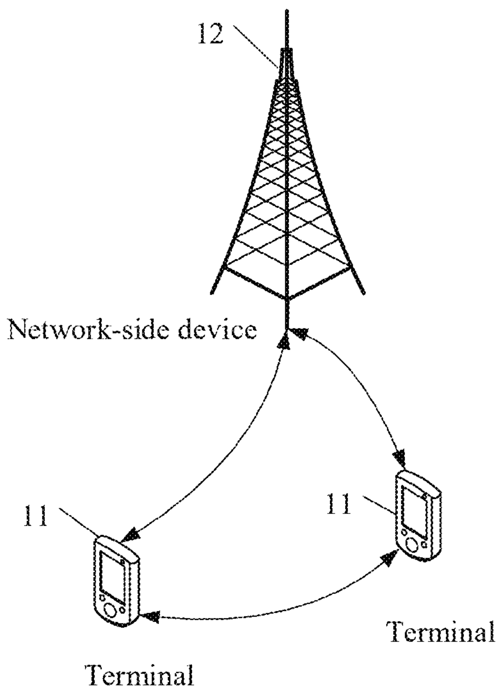
FIG. 1 is a block diagram of a wireless communication system to which the embodiments of this application are applicable.

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application fall within the protection scope of this application.

In the specification and claims of this application, the terms "first", "second", and the like are intended to distinguish between similar objects and do not necessarily describe a specific order or sequence. It should be understood that the data used in this way is interchangeable in appropriate circumstances so that the embodiments of this application described herein can be implemented in other orders than the order illustrated or described herein. Objects distinguished by "first" and "second" are generally one class. The number of the objects is not limited, for example, there may be one or more first objects. In addition, "and/or" in the specification and claims represents at least one of connected objects. The character "/" usually indicates an "or" relationship between associated objects.

eDRX involved in the embodiments of this application is described accordingly.

In an idle mode, a maximum value of a DRX cycle in legacy LTE is 2.56 s, and frequent awakening consumes power of UE. To reduce power consumption and prolong standby time, an eDRX (Extended idle-mode DRX cycle, extended discontinuous reception) mode is introduced in Release 13.

The following describes a concept of hyperframe (Hyper-SFN). In legacy LTE, a unit of time for synchronization between UE and eNodeB is a system frame number-SFN (System Frame Number). One SFN is 10 ms. A value range of the SFN is 0-5023. After the SFN reaches 5023, the SFN starts again from 0. A maximum period of the SFN is 5024 SFNs=50240 ms=10.24 s. Therefore, some periods (for example, a paging period and a Connected DRX cycle) in the legacy LTE are shorter than 10.24 s. To achieve a purpose of saving power, it is clear that 10.24 s cannot satisfy the requirements of the paging period. In this case, the concept of hyperframe H-SFN is introduced. One H-SFN corresponds to 5024 SFNs, that is, one hyperframe is equal to 10.24 s. A value range of the H-SFN is 0-5023. A maximum period of the SFN is 5024 H-SFNs and corresponds to 2.9127 hours (5024× 10.24 s/60/60=2.9127).

In previous description of paging (paging time-frequency resources), an occasion for reading paging by UE is represented by (PF, PO), corresponding to (SFN, subframe). After eDRX is introduced, the occasion for reading paging by UE is represented by (PH, PF, PO). The following describes how the occasion is calculated in detail.

After eDRX is introduced, a few concepts are first described.

PH: Paging Hyperframe, that is, a hyperframe number of a paging message, in H-SFN.

PTW: Paging Time Window, that is, a paging time window, being an SFN range [PTW_start, PTW_end] in PH.

PTW_start: a starting position of PTW, in SFN.

PTW_end: an ending position of PTW, in SFN.

1. H-SFN of PH satisfies the following formula:

$$H\text{-}SFN \bmod T_{eDRX,H} = (UE\_ID\_H \bmod T_{eDRX,H}),$$

where

UE_ID_H: 12 most significant bits of hash ID; $T_{eDRX,H}$: eDRX cycle in H-SFNs, specified by upper-layer messages, with a value range of {2, 4, 6, . . . , 5024}.

2. SFN of PTW_start satisfies: SFN=256×$i_{eDRX}$, where $i_{eDRX}$=floor (UE_ID_H/$T_{eDRX,H}$) mod 4.

3. SFN of PTW_end satisfies: SFN=(PTW_start+L×100−1) mod 1024.

Parameters are interpreted as follows:

L: Paging Time window length (in seconds), configured by upper-layer messages.

After eDRX is introduced, an occasion for reading paging by UE is represented by (PH, PF, PO), more precisely (PH, PTW (PF, PO)). PH is first calculated, where a PTW window is located on the PH; then PTW_start and PTW_end are calculated to obtain a specific position of the PTW on the PH. A paging message is monitored in a conventional DRX mode (PF, PO) in the PTW window. To be specific, in the PTW, a calculation formula of PF/PO is the same as a calculation formula of non-eDRX.

It should be noted that the technology described in the embodiments of this application is not limited to long term evolution (LTE)/LTE-advanced (LTE-A) systems, but can also be used in various wireless communication systems such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. The technology described herein may be used in the above-mentioned systems and radio technologies as well as other systems and radio technologies. However, in the following descriptions, a new radio (NR) system is described for an illustration purpose, and NR terms are used in most of the following descriptions, although these technologies may also be applied to other applications than an NR system application, for example, a 6th generation (6G) communication system.

FIG. 1 is a block diagram of a wireless communication system to which the embodiments of this application are applicable. The wireless communication system includes a terminal 11 and a network-side device 12. The terminal 11 may also be referred to as a terminal device or user equipment (UE). The terminal 11 may be a terminal-side device such as a mobile phone, a tablet computer, a laptop computer also referred to as a notebook computer, a personal digital assistant (PDA), a palmtop computer, a netbook, an ultra-mobile personal computer (UMPC), a mobile Internet device (MID), a wearable device, vehicle user equipment (VUE), or pedestrian user equipment (PUE). The wearable device includes a bracelet, earphones, glasses, and the like. It should be noted that a specific type of the terminal 11 is not limited in the embodiments of this application. The network-side device 12 may be a base station or a core network. The base station may be referred to as a NodeB, an evolved NodeB, an access point, a base transceiver station (BTS), a radio base station, a radio transceiver, a basic service set (Basic Service Set, BSS), an extended service set (ESS), a home NodeB, a home evolved NodeB, a WLAN access point, a Wi-Fi node, a transmitting receiving point (TRP), or another appropriate term in the art. As long as the same technical effects are achieved, the base station is not limited to a specific technical term. It should be noted that only a base station in an NR system is used as an example in the embodiments of this application, but a specific type of the base station is not limited.

The paging message monitoring method provided in the embodiments of this application is described in detail below using specific embodiments and application scenarios thereof with reference to the accompanying drawings.

Figure 2:
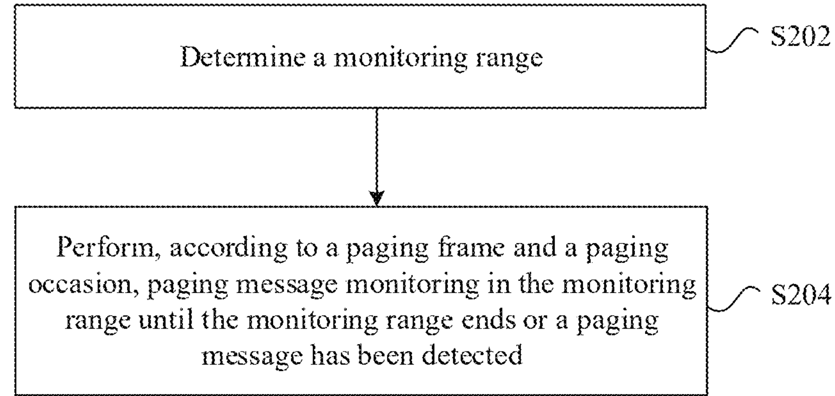
FIG. 2 is a flowchart of a paging message monitoring method according to an embodiment of this application.

An embodiment of this application provides a paging message monitoring method. The method is applied to a terminal. FIG. 2 is a flowchart of the paging message monitoring method according to this embodiment of this application. As shown in FIG. 2, the method includes the following steps:

Step S202: Determine a monitoring range.

Step S204: Perform, according to a paging frame PF and a PO, paging message monitoring in the monitoring range until the monitoring range ends or a paging message has been detected.

The monitoring range includes at least one of the following: a first monitoring sub-range or a second monitoring sub-range, where the first monitoring sub-range starts at the 1st radio frame of a paging hyperframe in a first paging time window PTW, and the first PTW ends at the end of the last PF of the first PTW, or the end of the last PO or the end of a monitor occasion MO of the last PO of the first PTW; and the second monitoring sub-range is one or more discontinuous reception DRX (Discontinuous Reception) periods in a second PTW.

Through step S202 and step S204, monitoring may be performed on paging messages according to the PF and the PO in the first monitoring sub-range and/or the second monitoring sub-range. The first PTW ends at the end of the last PF of the first PTW, or the end of the last PO or the end of the monitor occasion MO of the last PO of the first PTW, thereby ensuring that a paging message can be detected as soon as possible even if multiple MOs are present in one PO in a multi-beam scenario. For monitoring in the second monitoring sub-range, that is, for monitoring in one or more discontinuous reception DRX cycles in the second PTW, a paging message can also be detected as soon as possible, so as to resolve the problem of low paging message monitoring efficiency after introduction of multi-beam and early indication signal in the prior art.

It should be further noted that the first monitoring sub-range starts at the 1st radio frame of the paging hyperframe in the first PTW, and a radio frame number satisfies a preset correspondence with a terminal identifier; and the first monitoring sub-range ends at the end of the last PF of the first PTW, or the end of the last PO or the end of the monitor occasion MO of the last PO of the first PTW, and a radio frame number satisfies a preset correspondence with a terminal identifier. That is, the radio frame number in this embodiment of this application satisfies the preset correspondence with the terminal identifier.

Alternatively, PTW_start (start time of the first PTW) represents the 1st radio frame of a paging hyperframe of the PTW and is part of the PTW. SFN satisfies the following formula: SFN of PTW_start satisfies: SFN=256× $i_{eDRX}$, where $i_{eDRX}$=floor (UE_ID_H/$T_{eDRX,H}$) mod 4. It should be noted that the foregoing value (for example, 256 or 4) is merely an example of one parameter and other values may alternatively be selected according to a DRX or eDRX cycle.

PTW_end (stop time of the first PTW) is the last PF (or the last paging occasion or the last MO of the last PO) of the PTW. SFN satisfies the following formula: SFN=(PTW_start+L×100−1) mod 1024, where Lis a PTW length (in unit of second) and is configured based on an upper-layer message. It should be noted that the foregoing value is merely an example of one parameter and other values may alternatively be selected according to a DRX or eDRX cycle.

It should be further noted that the foregoing stop time being the end of the last PF of the first PTW, or the end of the last PO or the end of the MO of the last PO of the first PTW means:

the end of the last PF corresponding to the first PTW, or the end of the last PO or the end of the MO of the last PO of the first PTW (the last paging frame or last paging occasion, or last MO of the PO of the PTW); or further, the radio frame number satisfies the preset correspondence with the terminal identifier; or the end of the last PF in the first PTW, or the end of the last PO or the end of the MO of the last PO in the first PTW (the last paging frame or last paging occasion, or last MO of the PO in the PTW); or further, the radio frame number satisfies the preset correspondence with the terminal identifier; or the end of the last PF, or the end of the last PO or the end of the MO of the last PO of the first PTW; or further, the radio frame number satisfies the preset correspondence with the terminal identifier (the last paging frame or last paging occasion, or last MO of the PO and the SFN satisfying the equation).

A specific correspondence is described above and is not further described herein.

In addition, in an optional implementation of this embodiment of this application, in a case that the monitoring range includes the first monitoring sub-range or the second monitoring sub-range, the first PTW is different from the second PTW; or in a case that the monitoring range includes the first monitoring sub-range and the second monitoring sub-range, the first PTW is the same as the second PTW.

For the case that the monitoring range includes both the first monitoring sub-range and the second monitoring sub-range, that is, after the PTW defined by the first monitoring sub-range is used, the second monitoring sub-range defined is further used for paging monitoring. Alternatively, the terminal monitors paging messages in one or more discontinuous reception DRX cycles in the PTW (the first PTW) defined, where the PTW defined starts at the 1st radio frame of a paging hyperframe in the PTW, and the PTW defined ends at the end of the last PF of the PTW, or the end of the last PO or the end of an MO of the last PO of the PTW. In addition, the one or more discontinuous reception DRX cycles in the PTW defined may include multiple optional manners, which are specifically described in detail below.

In an optional implementation of this embodiment of this application, in a case that an early indication signal has been configured by a network-side device, a manner of performing, according to a PF and a PO, paging message monitoring in the monitoring range in step S204 may further includes:

Step S202-11: In a case that the early indication signal has been received and that the early indication signal indicates that paging message monitoring needs to be performed, perform, according to the PF and the PO, paging message monitoring in the second monitoring sub-range, where the early indication signal is used to indicate that the terminal performs paging message monitoring or starts a DRX activity timer; or Step S202-12: In a case that the early indication signal has not been received and that the network-side device indicates that paging message monitoring needs to be performed, perform, according to the PF and the PO, paging message monitoring in the second monitoring sub-range, where an indication from the network-side device is used to indicate that the terminal performs paging message monitoring or starts a DRX activity timer.

It can be learned from step S202-11 and step S202-12, the early indication signal has been configured by the network-side device; and in a case that the early indication signal has been received by the terminal, monitoring may be performed on the paging messages according to the PF and the PO in the second monitoring sub-range, or in a case that the early indication signal has not been received and that the network-side device indicates that paging message monitoring needs to be performed, monitoring may also be performed on the paging messages according to the PF and the PO in the second monitoring sub-range. That is, even if the terminal misses the early indication signal, monitoring may also be performed on the paging messages, thereby avoiding missing monitoring the paging messages due to missing of the early indication signal.

It should be noted that in the case that the early indication signal has been configured by the network-side device, the terminal can perform monitoring on the early indication signal in a range of the second PTW.

In an optional implementation of this embodiment of this application, the second monitoring sub-range in this embodiment of this application may include at least one of the following:

(1) N DRX cycles in the second PTW, where N is an integer greater than 1;

(2) one or more POs that are a preset interval later than a monitor occasion of the early indication signal;

(3) a range from a PO that is a preset interval apart from a monitor occasion of the early indication signal to end of the last PF of the N-th DRX cycle in the second PTW;

(4) a range from a PO that is a preset interval apart from a monitor occasion of the early indication signal to end of the last PO or end of an MO of the last PO of the N-th DRX cycle in the second PTW;

(5) a range from a PO that is a preset interval apart from a monitor occasion of the early indication signal to end of the last PF of the N-th DRX cycle in the second PTW;

(6) all paging messages in the second PTW (corresponding N=eDRX cycle/DRX cycle, that is, the number of DRX cycles in an eDRX range), where the manner (6) is a specific description of N in the manner (1);

(7) a range from the preset interval apart from a monitor occasion of the early indication signal to a monitor occasion of a next early indication signal;

(8) a first target range, where a range with the longest duration is selected as the first target range based on a comparison result between a first target sub-range or a second target sub-range and a third target sub-range; the first target sub-range is from a PO that is a preset interval apart from a monitor occasion of the early indication signal to end of the last PF of the N-th DRX cycle in the second PTW; the second target sub-range is from the PO that is a preset interval apart from the monitor occasion of the early indication signal to end of the last PO or end of an MO of the last PO of the N-th DRX cycle in the second PTW; and the third target sub-range is from the PO that is a preset interval apart from the monitor occasion of the early indication signal to end of the second PTW;

(9) a current DRX cycle corresponding to a PO that is a preset interval apart from a monitor occasion of the early indication signal;

(10) a range from a PO that is a preset interval apart from a monitor occasion of the early indication signal to end of the last PF of the current DRX cycle;

(11) a range from a PO that is a preset interval apart from a monitor occasion of the early indication signal to end of the last PO or end of an MO of the last PO of the current DRX cycle, or a next early indication signal;

(12) a second target range, where a range with the longest duration is selected as the second target range based on a comparison result between a fourth target sub-range or a fifth target sub-range or a sixth target sub-range and a seventh target sub-range; the fourth target sub-range is from a PO that is a preset interval apart from a monitor occasion of the early indication signal to end of the last PF of the current DRX cycle in the second PTW; the fifth target sub-range is from the PO that is a preset interval apart from the monitor occasion of the early indication signal to end of the last PO or end of an MO of the last PO of the current DRX cycle in the second PTW; the sixth target sub-range is from the PO that is a preset interval apart from the monitor occasion of the early indication signal to a PO that is a preset interval apart from a monitor occasion of a next early indication signal; and the seventh target sub-range is from the PO that is a preset interval apart from the monitor occasion of the early indication signal to end of the second PTW;

(13) a range from a PO that is a preset interval apart from a monitor occasion of the early indication signal to end of the last PF of the last DRX cycle in the second PTW, or from a PO that is a preset interval apart from a monitor occasion of the early indication signal to end of the last PO or end of an MO of the last PO of the last DRX cycle in the second PTW; or

(14) a third target range, where a range with the longest duration is selected as the third target range based on a comparison result between an eighth target sub-range or a ninth target sub-range and a tenth target sub-range; the eighth target sub-range is from a PO that is a preset interval apart from a monitor occasion of the early indication signal to end of the last PF of the last DRX cycle in the second PTW; the ninth target sub-range is from the PO that is a preset interval apart from a monitor occasion of the early indication signal to end of the last PO or end of an MO of the last PO of the last DRX cycle in the second PTW; and the tenth target sub-range is from the PO that is a preset interval apart from a monitor occasion of the early indication signal to end of the second PTW.

It should be noted that the preset interval Offset in the foregoing (1) to (14) is configured by a network or predefined by a protocol. Offset being equal to 0 indicates starting from a current moment, offset=1 indicates starting from a next moment, and offset>1 indicates an interval.

In another optional implementation of this embodiment of this application, in a case that no early indication signal has been configured by the network-side device, the performing, according to a PF and a PO, paging message monitoring in the monitoring range includes:

in a case that the network-side device indicates that the terminal performs paging message monitoring, performing, according to the PF and the PO, paging message monitoring in the second monitoring sub-range.

In a case that no early indication signal has been configured by the network-side device and paging message monitoring needs to be performed, the second monitoring sub-range in this embodiment of this application may include at least one of the following:

(1) a current DRX cycle corresponding to a moment of starting to perform a monitoring operation;

(2) N DRX cycles in the second PTW, where Nis an integer greater than 1;

(3) all paging messages in the second PTW;

(4) a range from start of performing a monitoring operation to end of the last PF, or end of the last PO or end of an MO of the last PO of the current DRX cycle; or (5) a fourth target range, where a range with the longest duration is selected as the fourth target range based on a comparison result between an eleventh target sub-range or a twelfth target sub-range and a thirteenth target sub-range; the eleventh target sub-range is from start of performing a monitoring operation to end of the last PF of the current DRX cycle; the twelfth target sub-range is from start of performing the monitoring operation to end of the last PO or end of an MO of the last PO of the current DRX cycle; and the thirteenth target sub-range is end of the second PTW.

It can be learned that, in this embodiment of this application, regardless of whether the early indication signal is configured or not, monitoring may be always performed on the paging messages according to the PF and the PO in the second monitoring sub-range, only with the second monitoring sub-range being different.

In this embodiment of this application, with the customized PTW stop time, it can be ensured that a paging message can be detected as soon as possible even if multiple MOs are present in one PO in a multi-beam scenario, and/or in a monitoring manner determined according to PTW, it is ensured that the terminal can detect a paging message as soon as possible while power saving can be implemented. The manner of this embodiment of this application may be applied to any scenario related to a multi-beam system or with multiple monitor occasions (MO) for paging messages.

It should be noted that the paging message monitoring method provided in this embodiment of this application may be performed by the paging message monitoring apparatus or a control module for performing the paging message monitoring method in the paging message monitoring apparatus. In this embodiment of this application, an example in which the paging message monitoring apparatus performs the paging message monitoring method is used for description of the paging message monitoring apparatus provided in this embodiment of this application.

Figure 3:
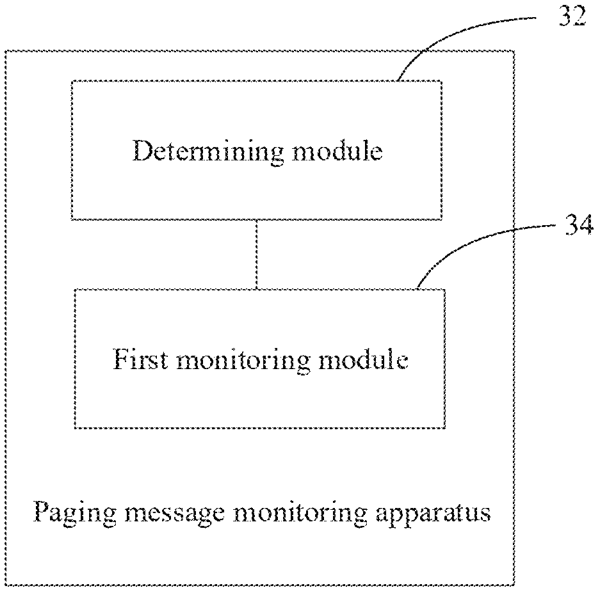
FIG. 3 is a schematic structural diagram of a paging message monitoring apparatus according to an embodiment of this application.

An embodiment of this application provides a paging message monitoring apparatus. FIG. 3 is a schematic structural diagram of the paging message monitoring apparatus according to this embodiment of this application. As shown in FIG. 3, the apparatus includes:

a determining module 32, configured to determine a monitoring range; and a first monitoring module 34, configured to perform, according to a PF and a PO, paging message monitoring in the monitoring range until the monitoring range ends or a paging message has been detected; where the monitoring range includes at least one of the following: a first monitoring sub-range or a second monitoring sub-range, where the first monitoring sub-range starts at the 1st radio frame of a paging hyperframe in a first paging time window PTW, and the first PTW ends at the end of the last PF of the first PTW, or the end of the last PO or the end of a monitor occasion MO of the last PO of the first PTW; and the second monitoring sub-range is one or more discontinuous reception DRX cycles in a second PTW.

Optionally, in a case that an early indication signal has been configured by a network-side device, the first monitoring module 34 may further include:

a first monitoring unit, configured to: in a case that the early indication signal has been received and that the early indication signal indicates that paging message monitoring needs to be performed, perform, according to the PF and the PO, paging message monitoring in the second monitoring sub-range, where the early indication signal is used to indicate that a terminal performs paging message monitoring or starts a DRX activity timer; or a second monitoring unit, configured to: in a case that the early indication signal has not been received and that the network-side device indicates that paging message monitoring needs to be performed, perform, according to the PF and the PO, paging message monitoring in the second monitoring sub-range, where an indication from the network-side device is used to indicate that the terminal performs paging message monitoring or starts a DRX activity timer.

Optionally, the apparatus in this embodiment of this application may further include: a second monitoring module, configured to: in a case that the early indication signal is configured by the network-side device, perform monitoring on the early indication signal in a range of the second PTW.

Optionally, the second monitoring sub-range includes at least one of the following:

(1) N DRX cycles in the second PTW, where N is an integer greater than 1;

(2) one or more POs that are a preset interval later than a monitor occasion of the early indication signal;

(3) a range from a PO that is a preset interval apart from a monitor occasion of the early indication signal to end of the last PF of the N-th DRX cycle in the second PTW;

(4) a range from a PO that is a preset interval apart from a monitor occasion of the early indication signal to end of the last PO or end of an MO of the last PO of the N-th DRX cycle in the second PTW;

(5) a range from a PO that is a preset interval apart from a monitor occasion of the early indication signal to end of the last PF of the N-th DRX cycle in the second PTW;

(6) all paging messages in the second PTW;

(7) a range from the preset interval apart from a monitor occasion of the early indication signal to a monitor occasion of a next early indication signal;

(8) a first target range, where a range with the longest duration is selected as the first target range based on a comparison result between a first target sub-range or a second target sub-range and a third target sub-range; the first target sub-range is from a PO that is a preset interval apart from a monitor occasion of the early indication signal to end of the last PF of the N-th DRX cycle in the second PTW; the second target sub-range is from the PO that is a preset interval apart from the monitor occasion of the early indication signal to end of the last PO or end of an MO of the last PO of the N-th DRX cycle in the second PTW; and the third target sub-range is from the PO that is a preset interval apart from the monitor occasion of the early indication signal to end of the second PTW;

(9) a current DRX cycle corresponding to a PO that is a preset interval apart from a monitor occasion of the early indication signal;

(10) a range from a PO that is a preset interval apart from a monitor occasion of the early indication signal to end of the last PF of the current DRX cycle;

(11) a range from a PO that is a preset interval apart from a monitor occasion of the early indication signal to end of the last PO or end of an MO of the last PO of the current DRX cycle, or a next early indication signal;

(12) a second target range, where a range with the longest duration is selected as the second target range based on a comparison result between a fourth target sub-range or a fifth target sub-range or a sixth target sub-range and a seventh target sub-range; the fourth target sub-range is from a PO that is a preset interval apart from a monitor occasion of the early indication signal to end of the last PF of the current DRX cycle in the second PTW; the fifth target sub-range is from the PO that is a preset interval apart from the monitor occasion of the early indication signal to end of the last PO or end of an MO of the last PO of the current DRX cycle in the second PTW; the sixth target sub-range is from the PO that is a preset interval apart from the monitor occasion of the early indication signal to a PO that is a preset interval apart from a monitor occasion of a next early indication signal; and the seventh target sub-range is from the PO that is a preset interval apart from the monitor occasion of the early indication signal to end of the second PTW;

(13) a range from a PO that is a preset interval apart from a monitor occasion of the early indication signal to end of the last PF of the last DRX cycle in the second PTW, or from a PO that is a preset interval apart from a monitor occasion of the early indication signal to end of the last PO or end of an MO of the last PO of the last DRX cycle in the second PTW; or

(14) a third target range, where a range with the longest duration is selected as the third target range based on a comparison result between an eighth target sub-range or a ninth target sub-range and a tenth target sub-range; the eighth target sub-range is from a PO that is a preset interval apart from a monitor occasion of the early indication signal to end of the last PF of the last DRX cycle in the second PTW; the ninth target sub-range is from the PO that is a preset interval apart from a monitor occasion of the early indication signal to end of the last PO or end of an MO of the last PO of the last DRX cycle in the second PTW; and the tenth target sub-range is from the PO that is a preset interval apart from a monitor occasion of the early indication signal to end of the second PTW.

Optionally, in a case that no early indication signal has been configured by the network-side device, the first monitoring module 34 is further configured to: in a case that the network-side device indicates that the terminal performs paging message monitoring, perform, according to the PF and the PO, paging message monitoring in the second monitoring sub-range.

Optionally, the second monitoring sub-range in this embodiment of this application includes at least one of the following:

(1) a current DRX cycle corresponding to a moment of starting to perform a monitoring operation;

(2) N DRX cycles in the second PTW, where Nis an integer greater than 1;

(3) all paging messages in the second PTW;

(4) a range from start of performing a monitoring operation to end of the last PF, or end of the last PO or end of an MO of the last PO of the current DRX cycle; or (5) a fourth target range, where a range with the longest duration is selected as the fourth target range based on a comparison result between an eleventh target sub-range or a twelfth target sub-range and a thirteenth target sub-range; the eleventh target sub-range is from start of performing a monitoring operation to end of the last PF of the current DRX cycle; the twelfth target sub-range is from start of performing the monitoring operation to end of the last PO or end of an MO of the last PO of the current DRX cycle.

Optionally, in a case that the monitoring range includes the first monitoring sub-range or the second monitoring sub-range, the first PTW is different from the second PTW; and in a case that the monitoring range includes the first monitoring sub-range and the second monitoring sub-range, the first PTW is the same as the second PTW.

The apparatus in this embodiment of this application may perform monitoring on paging messages according to the PF and the PO in the first monitoring sub-range and/or the second monitoring sub-range; the first PTW ends at the end of the last PF of the first PTW, or the end of the last PO or the end of the MO of the last PO of the first PTW, ensuring that a paging message can be detected as soon as possible even if multiple MOs are present in one PO in a multi-beam scenario. For monitoring in the second monitoring sub-range, that is, for monitoring in one or more discontinuous reception DRX cycles in the second PTW, a paging message can also be detected as soon as possible, so as to resolve the problem of low paging message monitoring efficiency after introduction of multi-beam and early indication signal in the prior art.

The paging message monitoring apparatus in this embodiment of this application may be an apparatus or may be a part, an integrated circuit, or a chip in a terminal. The apparatus may be a mobile terminal or a non-mobile terminal. For example, the mobile terminal may include but is not limited to a type of the terminal 11 listed above. The non-mobile terminal may be a server, a network attached storage (NAS), a personal computer (PC), a television (TV), a teller machine, a self-service machine, or the like. This is not specifically limited in this embodiment of this application.

The paging message monitoring apparatus in this embodiment of this application may be an apparatus including an operating system. The operating system may be an Android operating system, an iOS operating system, or other possible operating systems, and is not specifically limited in this embodiment of this application.

The paging message monitoring apparatus provided in this embodiment of this application can implement processes implemented by the method embodiment in FIG. 2, with the same technical effects achieved. To avoid repetition, details are not described herein again.

Figure 4:
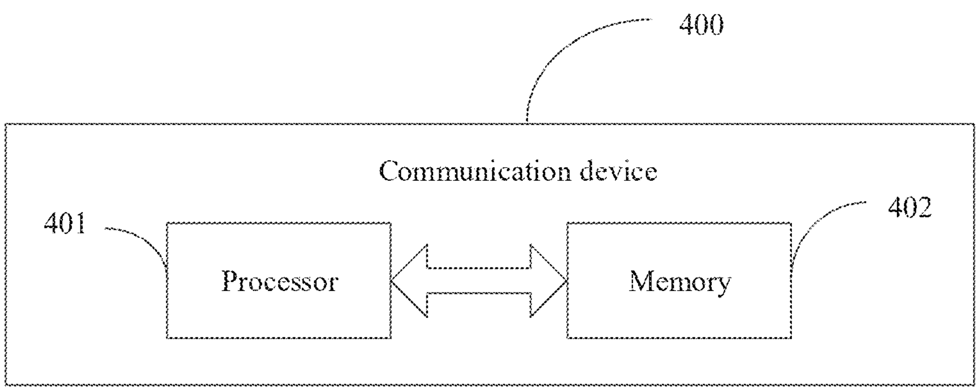
FIG. 4 is a schematic structural diagram of a communication device according to an embodiment of this application.

Optionally, as shown in FIG. 4, an embodiment of this application further provides a communication device 400, including a processor 401, a memory 402, and a program or instructions stored in the memory 402 and capable of running on the processor 401. For example, when the communication device 400 is a terminal and the program or instructions are executed by the processor 401, the processes of the foregoing embodiment of the paging message monitoring method can be implemented, with the same technical effects achieved. When the communication device 400 is a network-side device and the program or instructions are executed by the processor 401, the processes of the foregoing embodiment of the paging message monitoring method are implemented, with the same technical effects achieved. To avoid repetition, details are not described herein again.

Figure 5:
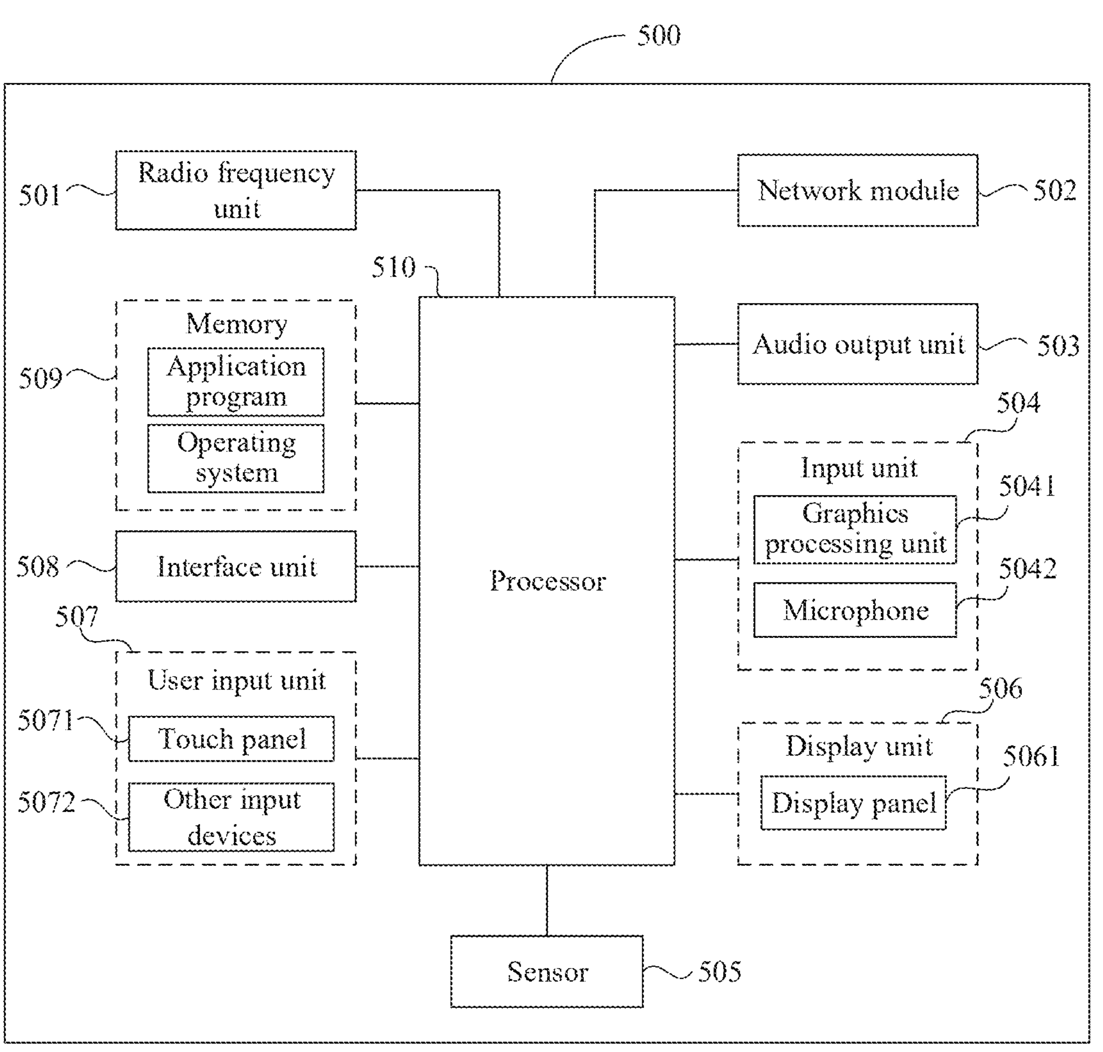
FIG. 5 is a schematic diagram of a hardware structure of a terminal for implementing an embodiment of this application.

FIG. 5 is a schematic diagram of a hardware structure of a terminal for implementing the embodiments of this application.

The terminal 500 includes but is not limited to components such as a radio frequency unit 501, a network module 502, an audio output unit 503, an input unit 504, a sensor 505, a display unit 506, a user input unit 507, an interface unit 508, a memory 509, and a processor 510.

A person skilled in the art can understand that the terminal 100 may further include a power supply (such as a battery) for supplying power to the components. The power supply may be logically connected to the processor 510 through a power management system. In this way, functions such as charge management, discharge management, and power consumption management are implemented using the power management system. The structure of the terminal shown in FIG. 5 does not constitute any limitation on the terminal. The terminal may include more or fewer components than shown in the FIG. 5, or a combination of some components, or the components disposed differently. Details are not described herein again.

It should be understood that, in this embodiment of this application, the input unit 504 may include a graphics processing unit (GPU) 5041 and a microphone 5042. The graphics processing unit 5041 processes image data of a static picture or a video that is obtained by an image capture apparatus (for example, a camera) in a video capture mode or an image capture mode. The display unit 506 may include the display panel 5061. The display panel 5061 may be configured in a form of a liquid crystal display, an organic light-emitting diode, or the like. The user input unit 507 includes a touch panel 5071 and other input devices 5072. The touch panel 5071 is also referred to as a touchscreen. The touch panel 5071 may include two parts: a touch detection apparatus and a touch controller. The other input devices 5072 may include but is not limited to a physical keyboard, a function key (such as a volume control key or an on/off key), a trackball, a mouse, and a joystick. Details are not described herein.

In this embodiment of this application, the radio frequency unit 501 sends downlink data received from a network-side device to the processor 510 for processing, and in addition, sends uplink data to the network-side device. Generally, the radio frequency unit 501 includes but is not limited to an antenna, at least one amplifier, a transceiver, a coupler, a low noise amplifier, a duplexer, and the like.

The memory 509 may be configured to store software programs or instructions and various data. The memory 509 may mainly include a program or instruction storage region and a data storage region. The program or instruction storage region may store an operating system, an application program or instructions required by at least one function (for example, an audio play function or an image play function), and the like. In addition, the memory 509 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. For example, at least one magnetic disk storage device, a flash storage device, or another volatile solid-state storage device.

The processor 510 may include one or more processing units. Optionally, the processor 510 may integrate an application processor and a modem processor. The application processor mainly processes an operating system, a user interface, an application program, instructions, or the like. The modem processor mainly processes wireless communication, for example, a baseband processor. It can be understood that the modem processor may be alternatively not integrated in the processor 510.

The processor 510 is configured to: determine a monitoring range; and perform, according to the PF and the PO, paging message monitoring in the monitoring range until the monitoring range ends or a paging message has been detected.

The monitoring range includes at least one of the following: a first monitoring sub-range or a second monitoring sub-range, where the first monitoring sub-range starts at the 1st radio frame of a paging hyperframe in a first paging time window PTW, and the first PTW ends at the end of the last PF of the first PTW, or the end of the last PO or the end of an MO of the last PO of the first PTW; and the second monitoring sub-range is one or more discontinuous reception DRX cycles in a second PTW.

The terminal in this embodiment of this application may perform monitoring on paging messages according to the paging frame PF and the PO in the first monitoring sub-range and/or the second monitoring sub-range; the first PTW ends at the end of the last PF of the first PTW, or the end of the last PO or the end of the MO of the last PO of the first PTW, ensuring that a paging message can be detected as soon as possible even if multiple MOs are present in one PO in a multi-beam scenario. For monitoring in the second monitoring sub-range, that is, for monitoring in one or more discontinuous reception DRX cycles in the second PTW, a paging message can also be detected as soon as possible, so as to resolve the problem of low paging message monitoring efficiency after introduction of multi-beam and early indication signal in the prior art.

An embodiment of this application further provides a readable storage medium, where the readable storage medium stores a program or instructions, and when the program or instructions are executed by a processor, the processes of the foregoing embodiment of the paging message monitoring method are implemented, with the same technical effects achieved. To avoid repetition, details are not described herein again.

The processor is the processor in the terminal in the foregoing embodiment. The readable storage medium includes a computer-readable storage medium such as a computer read-only memory (ROM), a random access memory (RAM), a magnetic disk, or an optical disc.

An embodiment of this application further provides a chip, where the chip includes a processor and a communication interface, the communication interface is coupled to the processor, and the processor is configured to run a program or instructions of a network-side device to implement the processes of the foregoing embodiment of the paging message monitoring method, with the same technical effects achieved. To avoid repetition, details are not described herein again.

It should be understood that the chip mentioned in this embodiment of this application may also be referred to as a system-level chip, a system chip, a chip system, a system-on-chip, or the like.

An embodiment of this application further provides a computer program product, where the computer program product is stored in a non-volatile readable storage medium. When the computer program product is executed by at least one processor, the processes of the foregoing embodiment of the paging message monitoring method are implemented, with the same technical effects achieved. To avoid repetition, details are not described herein again.

It should be noted that, in this specification, the terms “include” and “comprise”, or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by “includes a . . . ” does not preclude the existence of other identical elements in the process, method, article, or apparatus that includes the element. In addition, it should be noted that the scopes of the method and apparatus in the implementations of this application are not limited to performing functions in the sequence shown or discussed, and may further include performing functions at substantially the same time or in a reverse sequence according to the involved functions. For example, the described method may be performed in a sequence different from the described sequence, and steps may be added, omitted, or combined. In addition, features described with reference to some examples may be combined in other examples.

By means of the foregoing description of the implementations, persons skilled in the art may clearly understand that the method in the foregoing embodiment may be implemented by software with a necessary general hardware platform. Certainly, the method in the foregoing embodiment may also be implemented by hardware. However, in many cases, the former is a preferred implementation. Based on such understanding, the technical solutions of this application essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, a person of ordinary skill in the art may develop many other manners without departing from principles of this application and the protection scope of the claims, and all such manners fall within the protection scope of this application.

What is claimed is:

1. A paging message monitoring method performed by a mobile terminal, comprising:

determining, by the mobile terminal, a monitoring range based on an identifier of the mobile terminal; and performing, according to a paging frame (PF) and a paging occasion (PO), paging message monitoring in the monitoring range until the monitoring range ends or a paging message has been detected; wherein the determining, by the mobile terminal, a monitoring range based on an identifier of the mobile terminal comprises:

receiving, by the mobile terminal and from a network-side device, a preset correspondence between radio frame numbers and the identifier of the mobile terminal;

determining, by the mobile terminal and in response to a radio frame number of the 1st radio frame of a paging hyperframe in a first paging time window (PTW) satisfying the preset correspondence with the identifier of the mobile terminal, the 1st radio frame as the starting of a first monitoring sub-range;

determining, by the mobile terminal, the end of the last PO or the end of a monitor occasion (MO) of the last PO of the first PTW as the ending of the first monitoring sub-range;

determining, by the mobile terminal, one or more discontinuous reception cycles in a second PTW as a second monitoring sub-range;

determining, by the mobile terminal, both the first monitoring sub-range and the second monitoring sub-range as the monitoring range, wherein the first PTW is the same as the second PTW.

2. The method according to claim 1, wherein in a case that an early indication signal has been configured by the network-side device, the performing, according to a PF and a PO, paging message monitoring in the monitoring range comprises:

in a case that the early indication signal has been received and that the early indication signal indicates that paging message monitoring needs to be performed, performing, according to the PF and the PO, paging message monitoring in the second monitoring sub-range, wherein the early indication signal is used to indicate that the mobile terminal performs paging message monitoring or starts a DRX activity timer; or in a case that the early indication signal has not been received and that the network-side device indicates that paging message monitoring needs to be performed, performing, according to the PF and the PO, paging message monitoring in the second monitoring sub-range, wherein an indication from the network-side device is used to indicate that the mobile terminal performs paging message monitoring or starts a DRX activity timer.

3. The method according to claim 2, further comprising:

performing monitoring on the early indication signal in a range of the second PTW.

4. The method according to claim 2, wherein the second monitoring sub-range comprises at least one of the following:

N DRX cycles in the second PTW, wherein Nis an integer greater than 1;

one or more POs that are a preset interval later than a monitor occasion of the early indication signal;

a range from a PO that is a preset interval apart from a monitor occasion of the early indication signal to end of the last PF of the N-th DRX cycle in the second PTW;

a range from a PO that is a preset interval apart from a monitor occasion of the early indication signal to end of the last PO or end of an MO of the last PO of the N-th DRX cycle in the second PTW;

a range from a PO that is a preset interval apart from a monitor occasion of the early indication signal to end of the last PF of the N-th DRX cycle in the second PTW;

all paging messages in the second PTW;

a range from the preset interval apart from a monitor occasion of the early indication signal to a monitor occasion of a next early indication signal;

a first target range, wherein a range with the longest duration is selected as the first target range based on a comparison result between a first target sub-range or a second target sub-range and a third target sub-range; the first target sub-range is from a PO that is a preset interval apart from a monitor occasion of the early indication signal to end of the last PF of the N-th DRX cycle in the second PTW; the second target sub-range is from the PO that is a preset interval apart from the monitor occasion of the early indication signal to end of the last PO or end of an MO of the last PO of the N-th DRX cycle in the second PTW; and the third target sub-range is from the PO that is a preset interval apart from the monitor occasion of the early indication signal to end of the second PTW;

a current DRX cycle corresponding to a PO that is a preset interval apart from a monitor occasion of the early indication signal;

a range from a PO that is a preset interval apart from a monitor occasion of the early indication signal to end of the last PF of the current DRX cycle;

a range from a PO that is a preset interval apart from a monitor occasion of the early indication signal to end of the last PO or end of an MO of the last PO of the current DRX cycle, or a next early indication signal;

a second target range, wherein a range with the longest duration is selected as the second target range based on a comparison result between a fourth target sub-range or a fifth target sub-range or a sixth target sub-range and a seventh target sub-range; the fourth target sub-range is from a PO that is a preset interval apart from a monitor occasion of the early indication signal to end of the last PF of the current DRX cycle in the second PTW; the fifth target sub-range is from the PO that is a preset interval apart from the monitor occasion of the early indication signal to end of the last PO or end of an MO of the last PO of the current DRX cycle in the second PTW; the sixth target sub-range is from the PO that is a preset interval apart from the monitor occasion of the early indication signal to a PO that is a preset interval apart from a monitor occasion of a next early indication signal; and the seventh target sub-range is from the PO that is a preset interval apart from the monitor occasion of the early indication signal to end of the second PTW;

a range from a PO that is a preset interval apart from a monitor occasion of the early indication signal to end of the last PF of the last DRX cycle in the second PTW, or from a PO that is a preset interval apart from a monitor occasion of the early indication signal to end of the last PO or end of an MO of the last PO of the last DRX cycle in the second PTW; or a third target range, wherein a range with the longest duration is selected as the third target range based on a comparison result between an eighth target sub-range or a ninth target sub-range and a tenth target sub-range; the eighth target sub-range is from a PO that is a preset interval apart from a monitor occasion of the early indication signal to end of the last PF of the last DRX cycle in the second PTW; the ninth target sub-range is from the PO that is a preset interval apart from a monitor occasion of the early indication signal to end of the last PO or end of an MO of the last PO of the last DRX cycle in the second PTW; and the tenth target sub-range is from the PO that is a preset interval apart from a monitor occasion of the early indication signal to end of the second PTW.

5. The method according to claim 1, wherein in a case that no early indication signal is configured by the network-side device, the performing, according to a PF and a PO, paging message monitoring in the monitoring range comprises:

in a case that the network-side device indicates that the mobile terminal performs paging message monitoring, performing, according to the PF and the PO, paging message monitoring in the second monitoring sub-range.

6. The method according to claim 5, wherein the second monitoring sub-range comprises at least one of the following:

a current DRX cycle corresponding to a moment of starting to perform a monitoring operation;

N DRX cycles in the second PTW, wherein N is an integer greater than 1;

all paging messages in the second PTW;

a range from start of performing a monitoring operation to end of the last PF, or end of the last PO or end of an MO of the last PO of the current DRX cycle; or a fourth target range, wherein a range with the longest duration is selected as the fourth target range based on a comparison result between an eleventh target sub-range or a twelfth target sub-range and a thirteenth target sub-range; the eleventh target sub-range is from start of performing a monitoring operation to end of the last PF of the current DRX cycle; the twelfth target sub-range is from start of performing the monitoring operation to end of the last PO or end of an MO of the last PO of the current DRX cycle; and the thirteenth target sub-range is end of the second PTW.

7. A mobile terminal, comprising:

a processor; and a memory storing programs or instructions that is capable of running on the processor, wherein the programs or the instructions, when executed by the processor, cause the mobile terminal to perform the following steps:

determining a monitoring range based on an identifier of the mobile terminal; and performing, according to a paging frame (PF) and a paging occasion (PO), paging message monitoring in the monitoring range until the monitoring range ends or a paging message has been detected; wherein the determining a monitoring range based on an identifier of the mobile terminal comprises:

receiving, from a network-side device, a preset correspondence between radio frame numbers and the identifier of the mobile terminal;

determining, in response to a radio frame number of the 1st radio frame of a paging hyperframe in a first paging time window (PTW) satisfying the preset correspondence with the identifier of the mobile terminal, the 1st radio frame as the starting of a first monitoring sub-range;

determining the end of the last PO or the end of a monitor occasion (MO) of the last PO of the first PTW as the ending of the first monitoring sub-range;

determining one or more discontinuous reception cycles in a second PTW as a second monitoring sub-range;

determining both the first monitoring sub-range and the second monitoring sub-range as the monitoring range, wherein the first PTW is the same as the second PTW.

8. The mobile terminal according to claim 7, wherein in a case that an early indication signal has been configured by the network-side device, the performing, according to a PF and a PO, paging message monitoring in the monitoring range comprises:

in a case that the early indication signal has been received and that the early indication signal indicates that paging message monitoring needs to be performed, performing, according to the PF and the PO, paging message monitoring in the second monitoring sub-range, wherein the early indication signal is used to indicate that the mobile terminal performs paging message monitoring or starts a DRX activity timer; or in a case that the early indication signal has not been received and that the network-side device indicates that paging message monitoring needs to be performed, performing, according to the PF and the PO, paging message monitoring in the second monitoring sub-range, wherein an indication from the network-side device is used to indicate that the mobile terminal performs paging message monitoring or starts a DRX activity timer.

9. The mobile terminal according to claim 8, wherein the programs or the instructions, when executed by the processor, cause the mobile terminal to further perform the following steps:

performing monitoring on the early indication signal in a range of the second PTW.

10. The mobile terminal according to claim 8, wherein the second monitoring sub-range comprises at least one of the following:

N DRX cycles in the second PTW, wherein N is an integer greater than 1;

one or more POs that are a preset interval later than a monitor occasion of the early indication signal;

a range from a PO that is a preset interval apart from a monitor occasion of the early indication signal to end of the last PF of the N-th DRX cycle in the second PTW;

a range from a PO that is a preset interval apart from a monitor occasion of the early indication signal to end of the last PO or end of an MO of the last PO of the N-th DRX cycle in the second PTW;

a range from a PO that is a preset interval apart from a monitor occasion of the early indication signal to end of the last PF of the N-th DRX cycle in the second PTW;

all paging messages in the second PTW;

a range from the preset interval apart from a monitor occasion of the early indication signal to a monitor occasion of a next early indication signal;

a first target range, wherein a range with the longest duration is selected as the first target range based on a comparison result between a first target sub-range or a second target sub-range and a third target sub-range; the first target sub-range is from a PO that is a preset interval apart from a monitor occasion of the early indication signal to end of the last PF of the N-th DRX cycle in the second PTW; the second target sub-range is from the PO that is a preset interval apart from the monitor occasion of the early indication signal to end of the last PO or end of an MO of the last PO of the N-th DRX cycle in the second PTW; and the third target sub-range is from the PO that is a preset interval apart from the monitor occasion of the early indication signal to end of the second PTW;

a current DRX cycle corresponding to a PO that is a preset interval apart from a monitor occasion of the early indication signal;

a range from a PO that is a preset interval apart from a monitor occasion of the early indication signal to end of the last PF of the current DRX cycle;

a range from a PO that is a preset interval apart from a monitor occasion of the early indication signal to end of the last PO or end of an MO of the last PO of the current DRX cycle, or a next early indication signal;

a second target range, wherein a range with the longest duration is selected as the second target range based on a comparison result between a fourth target sub-range or a fifth target sub-range or a sixth target sub-range and a seventh target sub-range; the fourth target sub-range is from a PO that is a preset interval apart from a monitor occasion of the early indication signal to end of the last PF of the current DRX cycle in the second PTW; the fifth target sub-range is from the PO that is a preset interval apart from the monitor occasion of the early indication signal to end of the last PO or end of an MO of the last PO of the current DRX cycle in the second PTW; the sixth target sub-range is from the PO that is a preset interval apart from the monitor occasion of the early indication signal to a PO that is a preset interval apart from a monitor occasion of a next early indication signal; and the seventh target sub-range is from the PO that is a preset interval apart from the monitor occasion of the early indication signal to end of the second PTW;

a range from a PO that is a preset interval apart from a monitor occasion of the early indication signal to end of the last PF of the last DRX cycle in the second PTW, or from a PO that is a preset interval apart from a monitor occasion of the early indication signal to end of the last PO or end of an MO of the last PO of the last DRX cycle in the second PTW; or a third target range, wherein a range with the longest duration is selected as the third target range based on a comparison result between an eighth target sub-range or a ninth target sub-range and a tenth target sub-range; the eighth target sub-range is from a PO that is a preset interval apart from a monitor occasion of the early indication signal to end of the last PF of the last DRX cycle in the second PTW; the ninth target sub-range is from the PO that is a preset interval apart from a monitor occasion of the early indication signal to end of the last PO or end of an MO of the last PO of the last DRX cycle in the second PTW; and the tenth target sub-range is from the PO that is a preset interval apart from a monitor occasion of the early indication signal to end of the second PTW.

11. The mobile terminal according to claim 7, wherein in a case that no early indication signal is configured by the network-side device, the performing, according to a PF and a PO, paging message monitoring in the monitoring range comprises:

in a case that the network-side device indicates that the mobile terminal performs paging message monitoring, performing, according to the PF and the PO, paging message monitoring in the second monitoring sub-range.

12. The mobile terminal according to claim 11, wherein the second monitoring sub-range comprises at least one of the following:

a current DRX cycle corresponding to a moment of starting to perform a monitoring operation;

N DRX cycles in the second PTW, wherein N is an integer greater than 1;

all paging messages in the second PTW;

a range from start of performing a monitoring operation to end of the last PF, or end of the last PO or end of an MO of the last PO of the current DRX cycle; or a fourth target range, wherein a range with the longest duration is selected as the fourth target range based on a comparison result between an eleventh target sub-range or a twelfth target sub-range and a thirteenth target sub-range; the eleventh target sub-range is from start of performing a monitoring operation to end of the last PF of the current DRX cycle; the twelfth target sub-range is from start of performing the monitoring operation to end of the last PO or end of an MO of the last PO of the current DRX cycle; and the thirteenth target sub-range is end of the second PTW.

13. A non-transitory readable storage medium storing programs or instructions, wherein the programs or the instructions, when executed by a processor of a mobile terminal, cause the processor to perform the following steps:

determining a monitoring range based on an identifier of the mobile terminal; and performing, according to a paging frame (PF) and a paging occasion (PO), paging message monitoring in the monitoring range until the monitoring range ends or a paging message has been detected; wherein the determining a monitoring range based on an identifier of the mobile terminal comprises:

receiving, from a network-side device, a preset correspondence between radio frame numbers and the identifier of the mobile terminal;

determining, in response to a radio frame number of the 1st radio frame of a paging hyperframe in a first paging time window (PTW) satisfying the preset correspondence with the identifier of the mobile terminal, the 1st radio frame as the starting of a first monitoring sub-range;

determining the end of the last PO or the end of a monitor occasion (MO) of the last PO of the first PTW as the ending of the first monitoring sub-range;

determining one or more discontinuous reception cycles in a second PTW as a second monitoring sub-range;

determining both the first monitoring sub-range and the second monitoring sub-range as the monitoring range, wherein the first PTW is the same as the second PTW.

14. The non-transitory readable storage medium according to claim 13, wherein in a case that an early indication signal has been configured by the network-side device, the performing, according to a PF and a PO, paging message monitoring in the monitoring range comprises:

in a case that the early indication signal has been received and that the early indication signal indicates that paging message monitoring needs to be performed, performing, according to the PF and the PO, paging message monitoring in the second monitoring sub-range, wherein the early indication signal is used to indicate that the mobile terminal performs paging message monitoring or starts a DRX activity timer; or in a case that the early indication signal has not been received and that the network-side device indicates that paging message monitoring needs to be performed, performing, according to the PF and the PO, paging message monitoring in the second monitoring sub-range, wherein an indication from the network-side device is used to indicate that the mobile terminal performs paging message monitoring or starts a DRX activity timer.

15. The non-transitory readable storage medium according to claim 14, wherein the programs or the instructions, when executed by a processor, cause the processor to further perform the following steps:

performing monitoring on the early indication signal in a range of the second PTW.

16. The non-transitory readable storage medium according to claim 14, wherein the second monitoring sub-range comprises at least one of the following:

N DRX cycles in the second PTW, wherein N is an integer greater than 1;

one or more POs that are a preset interval later than a monitor occasion of the early indication signal;

a range from a PO that is a preset interval apart from a monitor occasion of the early indication signal to end of the last PF of the N-th DRX cycle in the second PTW;

a range from a PO that is a preset interval apart from a monitor occasion of the early indication signal to end of the last PO or end of an MO of the last PO of the N-th DRX cycle in the second PTW;

a range from a PO that is a preset interval apart from a monitor occasion of the early indication signal to end of the last PF of the N-th DRX cycle in the second PTW;

all paging messages in the second PTW;

a range from the preset interval apart from a monitor occasion of the early indication signal to a monitor occasion of a next early indication signal;

a first target range, wherein a range with the longest duration is selected as the first target range based on a comparison result between a first target sub-range or a second target sub-range and a third target sub-range; the first target sub-range is from a PO that is a preset interval apart from a monitor occasion of the early indication signal to end of the last PF of the N-th DRX cycle in the second PTW; the second target sub-range is from the PO that is a preset interval apart from the monitor occasion of the early indication signal to end of the last PO or end of an MO of the last PO of the N-th DRX cycle in the second PTW; and the third target sub-range is from the PO that is a preset interval apart from the monitor occasion of the early indication signal to end of the second PTW;

a current DRX cycle corresponding to a PO that is a preset interval apart from a monitor occasion of the early indication signal;

a range from a PO that is a preset interval apart from a monitor occasion of the early indication signal to end of the last PF of the current DRX cycle;

a range from a PO that is a preset interval apart from a monitor occasion of the early indication signal to end of the last PO or end of an MO of the last PO of the current DRX cycle, or a next early indication signal;

a second target range, wherein a range with the longest duration is selected as the second target range based on a comparison result between a fourth target sub-range or a fifth target sub-range or a sixth target sub-range and a seventh target sub-range; the fourth target sub-range is from a PO that is a preset interval apart from a monitor occasion of the early indication signal to end of the last PF of the current DRX cycle in the second PTW; the fifth target sub-range is from the PO that is a preset interval apart from the monitor occasion of the early indication signal to end of the last PO or end of an MO of the last PO of the current DRX cycle in the second PTW; the sixth target sub-range is from the PO that is a preset interval apart from the monitor occasion of the early indication signal to a PO that is a preset interval apart from a monitor occasion of a next early indication signal; and the seventh target sub-range is from the PO that is a preset interval apart from the monitor occasion of the early indication signal to end of the second PTW;

a range from a PO that is a preset interval apart from a monitor occasion of the early indication signal to end of the last PF of the last DRX cycle in the second PTW, or from a PO that is a preset interval apart from a monitor occasion of the early indication signal to end of the last PO or end of an MO of the last PO of the last DRX cycle in the second PTW; or a third target range, wherein a range with the longest duration is selected as the third target range based on a comparison result between an eighth target sub-range or a ninth target sub-range and a tenth target sub-range; the eighth target sub-range is from a PO that is a preset interval apart from a monitor occasion of the early indication signal to end of the last PF of the last DRX cycle in the second PTW; the ninth target sub-range is from the PO that is a preset interval apart from a monitor occasion of the early indication signal to end of the last PO or end of an MO of the last PO of the last DRX cycle in the second PTW; and the tenth target sub-range is from the PO that is a preset interval apart from a monitor occasion of the early indication signal to end of the second PTW.

17. The non-transitory readable storage medium according to claim 13, wherein in a case that no early indication signal is configured by the network-side device, the performing, according to a PF and a PO, paging message monitoring in the monitoring range comprises:

in a case that the network-side device indicates that the mobile terminal performs paging message monitoring, performing, according to the PF and the PO, paging message monitoring in the second monitoring sub-range.

18. The non-transitory readable storage medium according to claim 17, wherein the second monitoring sub-range comprises at least one of the following:

a current DRX cycle corresponding to a moment of starting to perform a monitoring operation;

N DRX cycles in the second PTW, wherein N is an integer greater than 1;

all paging messages in the second PTW;

a range from start of performing a monitoring operation to end of the last PF, or end of the last PO or end of an MO of the last PO of the current DRX cycle; or a fourth target range, wherein a range with the longest duration is selected as the fourth target range based on a comparison result between an eleventh target sub-range or a twelfth target sub-range and a thirteenth target sub-range; the eleventh target sub-range is from start of performing a monitoring operation to end of the last PF of the current DRX cycle; the twelfth target sub-range is from start of performing the monitoring operation to end of the last PO or end of an MO of the last PO of the current DRX cycle; and the thirteenth target sub-range is end of the second PTW.

* * * * *